H. HISER.
Bee Hive.
No. 2,692.  Patented June 27, 1842.
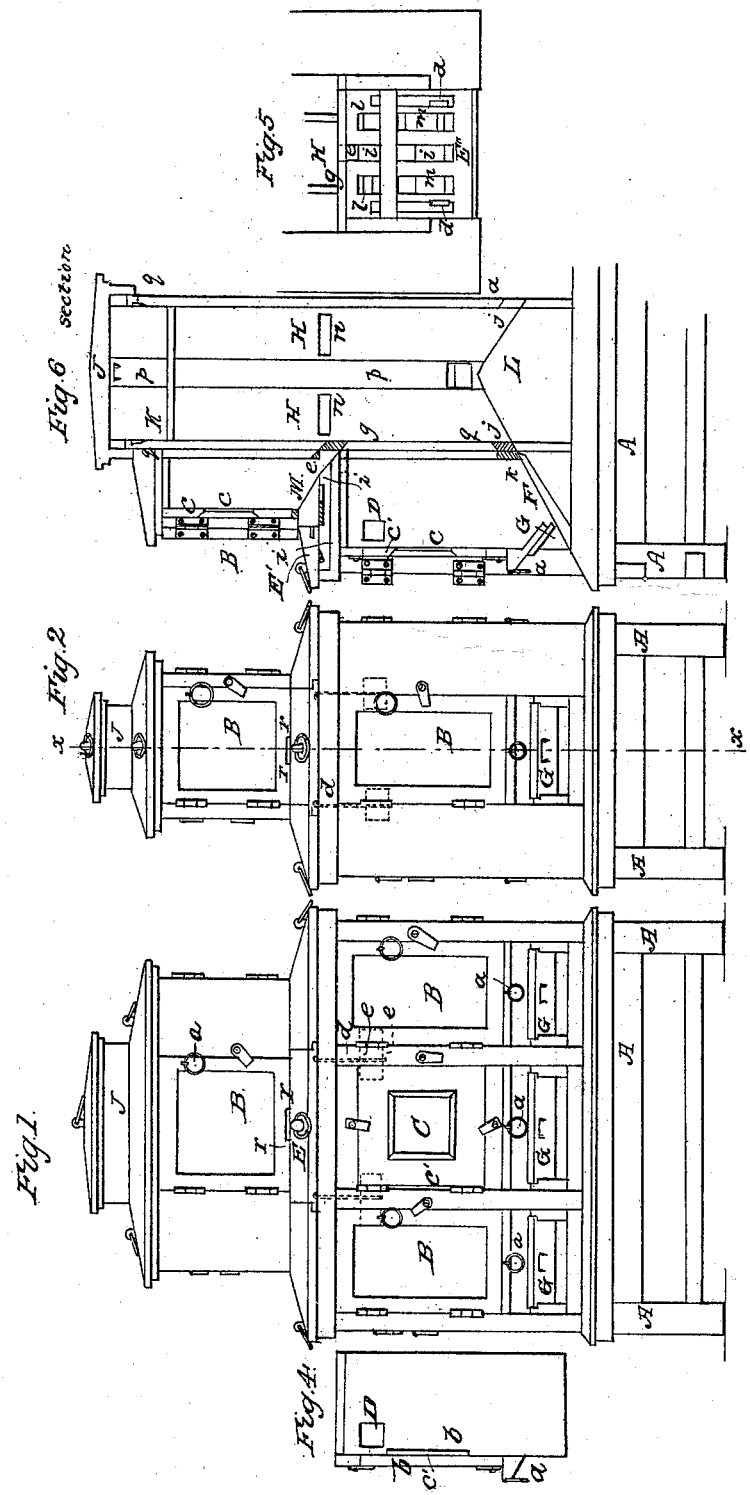

UNITED STATES PATENT OFFICE.

HENRY HISER, OF WOOSTER, OHIO.

BEEHIVE.

Specification of Letters Patent No. 2,692, dated June 27, 1842.

*To all whom it may concern:*

Be it known that I, HENRY HISER, of Wooster, in the county of Wayne and State of Ohio, have invented a new and useful improvement in the manner of constructing a bee-palace, or combined hive for the rearing and management of bees; and I do hereby declare that the following is a full and exact description thereof.

The palace, or combined hive, may vary in the number of its compartments, but as I usually construct it, it contains twelve separate compartments, or hives, which are so arranged as that the bees in any one compartment may have a communication opened from it into any of the others, when it is desired to divide a hive, or for any other purpose. In the accompanying drawing, Fig. 1, is an elevation of one side, and Fig. 2, an elevation of one end of the structure, the two sides and the two ends being alike. I make my palace two stories high, the lowermost containing eight, and the uppermost four compartments.

Figure 3, is a horizontal section of the palace a little above its lower floor, and represents a ground plan of said floor, showing the manner in which it is divided by partitions into eight parts. Each of the hives constitutes a separate box, or drawer, which are received within the spaces formed by the partitions, and either of which may be drawn out when necessary. The palace may be four feet long, and two feet six inches wide on its lower story.

A, A, is the stand, or frame, upon which it rests.

B, B, are doors which are hinged to the outer case, and partitions, and which serve to inclose the drawers, or hives; the door of the middle compartment of the lower story, Fig. 1, is suposed to be removed for the purpose of showing the front of one of the drawers, or compartments, each of which is furnished with a panel of glass C, through which the bees and their work, may be seen when the doors are open; C', is a shutter containing said glass; $a$, $a$, are rings, by which the drawers, or hives, may be removed.

Fig. 4, is a side view of one of the drawers; $b$, $b$, is a slot, or opening, through which a knife may be introduced to separate the hive from the glass, and from the shutter C', when it is desired to remove said shutter. A hole D, is made through both sides of the middle drawer in the lower story, through one side of each of the side drawers, and also through the partitions by which they are separated, so as to allow a passage for the bees from one of these compartments to the other, as indicated by the dotted lines $c$, $c$, Fig. 1; these passages are, usually, to be closed by means of slides of metal, or of wood, which pass down from the floor of the upper story, as shown by the dotted lines $d$, $d$, seen in Figs. 1 and 2; the upper ends of the slides $d$, $d$, are hidden by a movable block E, which slides in upon the upper floor, against the drawers of the upper story after they are in place; similar blocks are shown at E', on the end elevation, and also in Fig. 6, which figure is a vertical section of the structure in the line $x$ $x$ of Fig. 2, said section extending along beyond its center, but not its whole length, the two ends being alike. In Fig. 5, E", is a portion of the floor of the upper story, as seen in a top view when one of the end blocks E', is removed; $d$, $d$, being the upper ends of slides similar to those represented by the dotted lines at $d$, $d$, Fig. 1, and also in Fig. 2. Through the backs of each of the end drawers of the lower story, there is an opening like that shown at D, Fig. 4, which correspond with openings in the partitions which divide these drawers from the lower end drawers, seen in Fig. 2; and there are openings similar to those marked D, in both sides of said drawers. It will be seen, therefore, that by the openings D, and by the analogous openings above described, all the drawers, or hives, in the lower story may be made to communicate with each other, and that these communications may be cut off by the slides $d$, $d$.

The bottom of each of the drawers in the series of lower compartments are inclined forward, as shown at F, Fig. 6, and they are each furnished with sliding shutters G, G, under which the bees enter; these shutters may be opened and closed at pleasure; such sloping bottoms and sliding shutters are well known, having been used in many other bee houses, or hives.

To connect the lower with the upper story, and to allow a passage for the bees from one to the other, as well as for other purposes, I construct a vertical, central opening extending from the bottom of the lower story through the roof, or top, of the upper; the lower portion of this opening is shown at H, H, Fig. 3, surrounded by the spaces I, I, for receiving the drawers; its elevation, in width, is also shown at H, H, in the section, Fig. 6. J, J, is a cap, or cover, to the top of this opening, which cap may be taken off when the slides inclosed by it are to be moved. K, is a horizontal partition inclosing the vertical opening H; and L, is a block which fills the capacity of said opening at its lower end, and is made sloping at top toward its four sides.

The bees enter the compartments of the upper story through openings r, r, and the bottom of each of the drawers in the upper story slope back as shown at M, Fig. 6, toward the opening H, H, in the center of the structure, so that the filth from the bees will pass in that direction as it is to fall into said opening; at the back edge of the bottom M, these drawers are open along their whole length, as shown at e; f, is an aperture through partition g, into the vertical opening H; i, in Figs. 5, and 6, is a slide by which the opening f, may be closed; when not closed, the filth from the upper drawers will fall through the opening f, to the bottom of the space H, whence it will pass through openings j, and k, on to the inclined floor F, of the lower story, and escape thence, with the filth from the lower compartments, in the ordinary way. In Fig. 5, l, l, are openings through the floor of the upper end compartment, which may be closed by slides m, m; the openings l, l, correspond with openings in the tops of the end drawers of the lower story, and through the floor of the upper story; and when the slides m, m, are drawn back, the bees can pass from the lower to the upper end compartment through said openings. Under each of the blocks E, on the sides of the structure, there are three slides similar to those marked m, i, in Fig. 5, but of greater width, the compartments being wider, and with this difference also; the middle slide covers an opening leading into the upper, from the lower, compartment, in the manner of the openings l, l, in Fig. 5; and the two side slides close openings through which the filth may fall into the space H; these openings are shown at n, n, Fig. 6, and the matters which pass through them on to the top of the block L, escape through the openings j, and k, or through similar openings o, on to the inclined floors of the compartments of the lower tier, the inclination of the block L, serving to conduct them thereto. The openings o, may be closed by slides p, p, and the openings j, by slides q, q, when the cover J, is removed; said slides moving in suitable grooves, and extending down from the top of the opening H, H, above the partition K, to the apertures which they are to close.

The center opening H, H, constitutes an important feature of my improvement, as by means of the various openings made into it, as above described, the bees may be allowed to pass through it from one story, and from one compartment, to another; and with the aid of the openings and slides which govern the communications through the sides, and through the tops and bottoms of the respective drawers, with their slides, as above described, a complete command of the palace is obtained, so that the bees may be allowed to pass from one compartment to another in any manner that may be required; any part, or portion, of the palace being made to communicate with, or the communication being cut off from, any other part, at pleasure.

Having thus, fully described the manner in which I construct my bee palace, it is to be understood that I do not claim the forming of a separate drawers, or hives, which may be removed at pleasure, nor do I claim the use of glazed partitions, or of slides for governing the communications from one compartment to another, these devices having been repeatedly used, and variously modified, but—

What I do claim as constituting my invention, and which I desire to secure by Letters Patent, is —

1. The combining with the respective compartments, a central, vertical opening, formed in the manner of that marked H, H, in the accompanying drawings, and around which opening the respective compartments are situated; there being apertures from said compartments leading into, and from, said vertical opening, which apertures are governed by slides, in the manner and for the purpose set forth.

2. I also claim, in combination with said central vertical opening, the manner in which I have arranged and combined the several apertures and slides, by which a communication is established or cut off between any part or parts of the structure; the whole being constructed substantially in the manner set forth, while such variations may be made therein as may be dictated by fancy or convenience, while the distinguishing features above claimed remain unchanged.

HENRY HISER.

Witnesses:
 JOHN H. DAVIS,
 J. C. MILLER.